No. 765,722. PATENTED JULY 26, 1904.
C. L. WEICHELT.
FRICTION DRIVING AND SPEED REGULATING DEVICE.
APPLICATION FILED APR. 13, 1904.
NO MODEL.

WITNESSES:

INVENTOR
Charles L. Weichelt.
BY
Chas. A. Cutter,
ATTORNEY.

No. 765,722. Patented July 26, 1904.

UNITED STATES PATENT OFFICE.

CHARLES L. WEICHELT, OF PHILADELPHIA, PENNSYLVANIA.

FRICTION DRIVING AND SPEED-REGULATING DEVICE.

SPECIFICATION forming part of Letters Patent No. 765,722, dated July 26, 1904.

Application filed April 13, 1904. Serial No. 202,907. (No model.)

*To all whom it may concern:*

Be it known that I, CHARLES L. WEICHELT, a citizen of the United States, and a resident of the city and county of Philadelphia, State of Pennsylvania, have invented certain new and useful Improvements in Friction Driving and Speed-Regulating Devices, of which the following is a specification.

My invention relates to improvements in friction driving and speed-regulating devices; and the object of my invention is to furnish a device to be interposed between a source of power and a driven machine, being itself driven by the first and driving the second, which will cause the driven machine to rotate with a substantially uniform speed irrespective of the speed of the driving-wheel or other source of power.

My invention is applicable to and particularly useful in driving an ignition dynamo for gas, gasolene, and oil engines in which a constant speed of the armature is desirable, so that a spark of a uniform size and intensity may be at all times delivered irrespective of the speed of the engine or other source of power from which the armature is driven; but it will be understood that while my friction-gear is primarily intended for use upon an ignition-dynamo I do not desire to confine it to this application, as it can be used wherever such an arrangement might be found useful.

Figure 1:
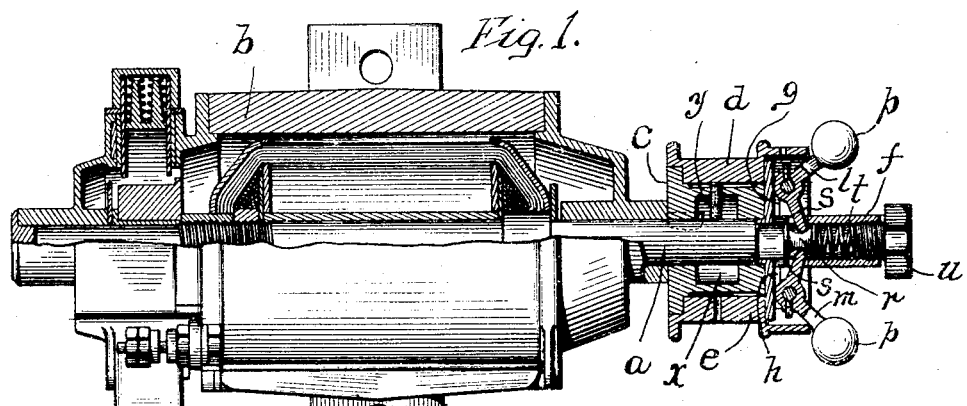
Figure 2:
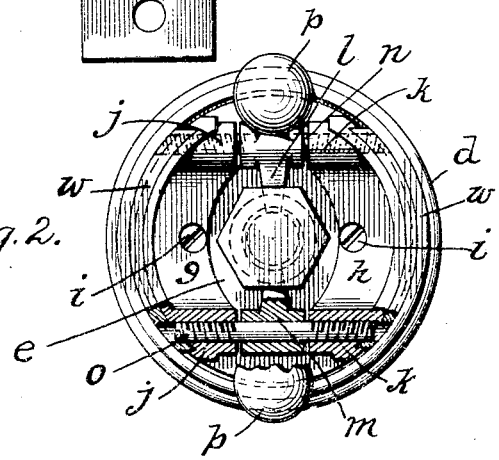
Figure 3:
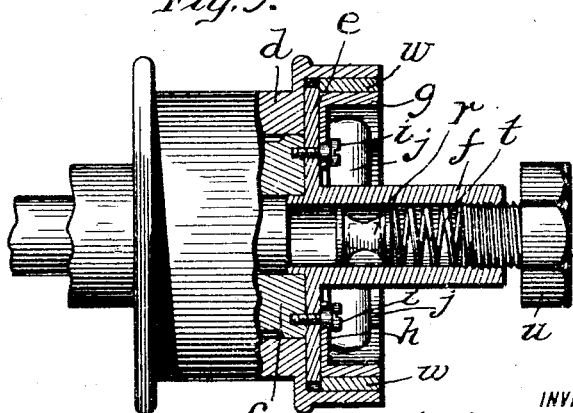

In the accompanying drawings, forming part of this specification, and in which similar letters of reference indicate similar parts throughout the several views, Figure 1 is a side elevation, partly in section, of a sparking dynamo furnished with my friction driving and speed-regulating device, the latter being shown in central sectional elevation; Fig. 2, a front elevation, enlarged, partly in section, of the regulating device, Fig. 1; Fig. 3, a side elevation, partly in section, of the regulating device, the section being at right angles to that shown in Fig. 1.

$a$ is the armature-shaft of the ignition-dynamo $b$.

$c$ is a hub fast upon shaft $a$; $d$, a pulley loosely carried by hub $c$; $e$, a plate carrying a hollow hub $f$.

$g$ $h$ are plates upon the outside of plate $e$.

$i$ represents screws passing through plates $g$ $h$ and plate $e$ and into the hub $c$. The holes in the plates $g$ $h$, through which the screws $i$ pass, are slightly larger than the diameter of the screws, so that they may have a movement as presently described. Upon the opposite ends of the plate $g$ are bosses $j$, bored and threaded, and upon opposite ends of the plate $h$ are bosses $k$, bored and threaded in an opposite direction from the threads in bosses $j$.

$l$ $m$ are angular levers, the first carried by a shaft $n$, the ends of which are threaded in opposite directions, one end entering and being carried by a boss $j$ on plate $g$, the other end entering and being carried by a boss $k$ on plate $h$ and the second carried by a similar shaft $o$, which enters and is carried by the bosses $j$ $k$ upon the opposite ends of plates $g$ $h$. The outer ends of levers $l$ $m$ carry balls or weights $p$, and their inner ends engage a sliding block $r$, carried by the hollow hub $f$ of plate $e$, the hub being slotted at $s$ $s$, Fig. 1, to permit the inner ends of levers $l$ $m$ to engage this block.

$t$ is a spring engaging the outer end of block $r$; $u$, a screw-plug closing the outer end of hub $f$ and forming a bearing for the outer end of spring $t$.

$w$, Figs. 2 and 3, are friction-shoes, of fiber, for instance, carried by the outer ends of plates $g$ $h$, adapted to engage the inner periphery of the outer end of pulley $d$.

$x$ is an oil-space within hub $c$, and $y$ a wick for carrying oil from space $x$ to the under side of pulley $d$.

The operation of the device is as follows: The pulley $d$ is driven by a belt and engages the friction-shoes $w$, and through these shoes the plates $g$ $h$ and the screws $i$ drive the hub $c$, which is fast to and drives the dynamo-shaft $a$. This driving continues so long as the predetermined revolutions of the shaft $a$ are not exceeded. Should the speed of the pulley $d$ exceed the desired speed of the shaft $a$, the centrifugal force will act to throw the outer or weighted ends of levers $l$ $m$ outward, and the rocking of the screws $n$ $o$, caused by the outward movement of the weighted ends of the levers, will cause the plates $g$ $h$ to be moved inward, so that the friction-shoes $w$ will disengage or bear less tightly against the pulley $d$, thus permitting the pulley to turn without driving the friction-shoes at the same speed as it itself turns. The disengagement of the pulley $d$ and the friction-shoes $w$ will be in proportion to the difference between the actual speed of the pulley and the desired speed of the shaft. If the difference be but slight, the disengagement will be but partial—that is to say, the levers $l\ m$ will move the friction-shoes but slightly inward, not entirely out of contact with the pulley $d$. If the difference in the speeds be very great, the shoes would be moved momentarily entirely out of contact with the pulley. I aim, however, if possible to so proportion the speeds of the pulley and of the shaft $a$ that an entire disengagement of the friction-shoes and driving-pulley would occur as seldom as possible, for the reëngagement of these parts if completely separated would almost inevitably result in unequal speeds of the shaft $a$. By setting the screw-plug $u$ in or out the operative movements of the levers $l\ m$ can be adjusted. If the spring be tightened, the levers will not respond to centrifugal action so soon as they would were the spring loosened.

Usually the speed of the driving member $d$ of the device varies within comparatively narrow limits, and by experiment the spring $t$ can be so set as to cause the levers $l\ m$ to operate the friction-shoes so delicately that these shoes never quite disengage the driving member, and the result is a steadiness of revolution of the shaft $a$ impossible in those governing devices which operate by constantly coupling and uncoupling the driving member and the driven shaft.

Having thus described my invention, I claim as new and desire to secure by Letters Patent—

1. In a friction driving and speed-regulating device, in combination, a rotary driving member, a driven shaft, a hub on said shaft upon the periphery of which said driving member is loosely carried, a plate secured to said hub, movable plates carried by said first plate, friction-shoes carried by said movable plates, adapted to engage said driving member, shafts adapted upon a rocking movement in one direction to move said movable plates and shoes away from said driving member, angular levers, carried by said shafts, weighted upon their outer ends, and spring-operated upon their inner ends, and a spring for operating said levers in one direction.

2. In a friction driving and speed-regulating device, in combination, a rotary driving member, a driven shaft, a hub on said shaft upon the periphery of which said driving member is loosely carried, a plate having a hollow hub, secured to said first hub, movable plates carried by said first plate, friction-shoes carried by said movable plates adapted to engage said driving member, shafts adapted upon a rocking movement in one direction to move said movable plates and friction-shoes into contact with and upon a rocking movement in the other direction to move said plates and shoes out of contact with said driving member, angular levers, carried by said shafts, weighted upon one end and engaging at the other end a sliding block within the hollow hub of the first plate, said block, a spring bearing against said block, and a screw-plug carried by said hub whereby the tension of said spring may be adjusted.

CHARLES L. WEICHELT.

Witnesses:
 GEORGE W. SELTZER,
 CHARLES A. RUTTER.